US005326830A

United States Patent [19]

Aharoni

[11] Patent Number: 5,326,830
[45] Date of Patent: Jul. 5, 1994

[54] PROCESS FOR PREPARING CHAIN EXTENDED POLYMERS AND GRAFT AND BLOCK COPOLYMERS

[75] Inventor: Shaul M. Aharoni, Morris Plains, N.J.

[73] Assignee: AlliedSignal Inc., Morristownship, N.J.

[21] Appl. No.: 152,061

[22] Filed: Nov. 12, 1993

Related U.S. Application Data

[63] Continuation of Ser. No. 916,553, Jul. 20, 1992, abandoned.

[51] Int. Cl.$^5$ .................. C08L 77/00; C08L 67/00; C08G 63/91
[52] U.S. Cl. .................. 525/418; 525/419; 525/420; 525/425; 525/432; 525/181; 525/397; 528/308.2
[58] Field of Search .............. 525/181, 397, 418, 419, 525/420, 437, 425, 432; 528/308.2

[56] References Cited

U.S. PATENT DOCUMENTS

| | | |
|---|---|---|
| 4,390,667 | 6/1983 | Aharoni et al. . |
| 4,417,031 | 11/1983 | Aharoni et al. . |
| 4,417,032 | 11/1983 | Khanna et al. . |
| 4,433,116 | 2/1984 | Largman et al. . |
| 4,568,720 | 2/1986 | Aharoni et al. . |
| 4,946,909 | 8/1990 | Bhattacharjee et al. . |
| 4,963,311 | 10/1990 | Aharoni et al. . |
| 5,037,897 | 8/1991 | Glans .................. 525/397 |
| 5,055,509 | 10/1991 | Bhattacharjee et al. . |

OTHER PUBLICATIONS

U.S. Patent Application, Ser. No. 903,438, filed on Jun. 24, 1992.

*Primary Examiner*—James J. Seidleck
*Assistant Examiner*—I. Zemel
*Attorney, Agent, or Firm*—Michele G. Mangini; Melanie L. Brown

[57] ABSTRACT

The invention relates to a process for forming chain extended polymers and graft and block polymers and copolymers which comprises the steps of: (a) forming an intimate mixture of one or more polymers and one or more effective phosphorus (III) chain extension reagent compounds; wherein at least one of said effective chain extension reagents has bonded to the phosphorus (III) atom at least one group which is a nitrogen-containing heteroaromatic moiety that is bonded through a nitrogen of the heteroaromatic moiety to the phosphorus (III) atom by a single bond; and (b) heating said mixture for a time and at a temperature sufficient to form said extended chain polymer or copolymer. Further embodiments relate to polymers and copolymers prepared in accordance with the process of this invention as well as articles formed from these polymers and polymer compositions comprising the polymeric materials of this invention.

19 Claims, No Drawings

PROCESS FOR PREPARING CHAIN EXTENDED POLYMERS AND GRAFT AND BLOCK COPOLYMERS

This application is a continuation of application Ser. No. 916,553 filed Jul. 20, 1992, now abandoned.

BACKGROUND OF THE INVENTION

1. Field of Invention

This invention relates to the process for coupling polymeric materials. More particularly, this invention relates to a process for preparing chain extended polymers and graft and/or block polymers and copolymers. Useful polymer reactants include polyamides and polyesters as well as other polymers as described herein. The process involves coupling the polymeric materials. Coupling as described above is referred to herein as a chain extension process. The polymers of this invention have increased molecular weights and/or melt viscosities. Polymers prepared in accordance with the process of this invention are capable of being fabricated into useful shaped articles of manufacture, e.g. filaments, both mono- and multifilament, films, tapes, ribbons, rods, containers, laminates and the like.

2. Description Of the .Prior Art

U.S. Pat. No. 4,568,720 to Aharoni discloses a process for preparing extended chain polyesters, and block or graft polyester or copolyesters by forming an intimate mixture of one or more polyesters and an effective amount of one or more chain extension reagent compounds, and thereafter heating the intimate mixture at a temperature and for a time sufficient to form the desired amount of the desired polyester or copolyester. Other patents such as 4,417,031; 4,433,116; 4,390,667; 4,963,311 and 4,946,909 disclose chain extension, graft, and block polymers containing polyamides, polyesters and other related polymers.

SUMMARY OF INVENTION

In accordance with this invention, there is provided a process for forming chain extended polymers and graft and block polymers and copolymers which comprises the steps of:

(a) forming an intimate mixture of one or more polymers and an effective amount of one or more effective phosphorus (III) chain extension reagent compounds;

wherein at least one of said effective chain extension reagents has bonded to the phosphorus (III) atom at least one group which is a nitrogen-containing heteroaromatic moiety that is bonded through a nitrogen of the heteroaromatic moiety to the phosphorus (III) atom by a single bond; and (b) heating said mixture for a time and at a temperature sufficient to form said extended chain polymer or copolymer.

A further embodiment of this invention relates to the a process for forming branched polymers. The branched polymers are formed by adding chain branching agents to the intimate mixture of step (a) described in the above process.

Another embodiment of this invention relates to polymers and copolymers prepared in accordance with the process of this invention as well as articles formed from these polymers and polymer compositions comprising the polymeric materials of this invention.

DETAILED DESCRIPTION OF THE INVENTION

The process of this invention is conveniently carried out in two steps. The first step of the process consists of forming an intimate mixture of (1) two or more appropriate polymers, and one or more effective chain extension reagent compounds. In the second step of the process, the intimate mixture is heated at a temperature and for a time sufficient to mix ingredients thoroughly and form the desired chain extended polymer or graft or block copolymer, as indicated by a increase in molecular weight and/or an increase in the viscosity of the polymer mixture. The chain extension reaction can be carried out in solution or in the melt by forming a molten mixture of the reactants.

In the solution process, both reactant polymers are dissolved in an aprotic amide solvent at temperatures higher than 115° C. For polyamides, the addition of a salt is beneficial to improve solubility. Illustrative of useful salts are soluble chloride and bromide salts, such as LiCl, LiBr or $CaCl_2$. A salt is not used for polyesters since the salt is detrimental. Illustrative of aprotic amide solvents are N,N-dimethylacetamide (DMAc), N-methyl-2-pyrrolidinone (NMP), tetramethylurea and dimethyl formamide (DMF). Hexamethylphosphoramide (HMP) may also be used but it is a known carcinogen. Preferably, DMAc and NMP are used, with the latter being preferred. Upon complete dissolution, an effective amount of one or more chain extension reagents and an effective amount of an organic base are added, and the reaction is allowed to proceed for a time sufficient to form the desired copolymeric material, usually up to about 6 hours. In the solution process, the condensation is carried out in the presence of a base. Useful bases may vary widely. Illustrative of useful bases are organic bases such as tertiary amines as for example, imidazole or trialkylamines. Preferred bases are tertiary amines and the most preferred base is pyridine.

The base is employed in an amount which is sufficient to promote the nucleophilic displacement condensation to any extent. In general, the molar amount of base employed is about equivalent to the molar amount of the chain extension reagent in the reaction mixture. When pyridine is the organic base, the reaction is best carried out under reflux at over 120° C.

In the solution process, the reaction is carried out at temperature equal to or greater than 115° C. and lower than the boiling point of the solvent. In the preferred embodiments of the invention, solution condensation process temperatures are from greater than about 115° C. to about 185° C., and more preferred reaction temperatures are from about 120° C. to about 155° C. The preferred temperature at which to conduct the reaction for any particular polymer depends on the nature of the polymer. In the case where a flexible polyester, such as poly(ethylene terephthalate) (PET) is used, the preferred temperature to conduct the grafting reaction is from abut 140° C. to about 185° C. and a more preferred temperature is from about 165° C. to about 180° C. When the polymer is a flexible polyamide, such as polycaprolactam, the preferred temperature is from greater than 115° C. to about 145° C., and a more preferred is from about 120° C. to about 135° C. For each polymer family, an appropriate reaction temperature may be used, usually dictated by the solubility of the polymer in the reaction solvent. In all cases, the reactions are conducted at temperatures higher than those prescribed by Yamazaki, Matsumoto and Higashi, *J. Polymer Sci.: Polym. Chem. Ed.*, 1975, 13 1373. These authors found the condensation to proceed best at temperatures of 95° C.±15° C.

In a preferred embodiment of this invention, the intimate mixture of one or more polymers and chain extension reagents in the first process step is a molten mixture. As used herein, "molten mixture" is an intimate mixture which has been heated to a temperature which is equal to or greater than the melting point of at least one of the polymer components of the mixture. The manner in which the molten mixture is formed is not critical and conventional methods can be employed. For example, the molten mixture can be formed by maintaining the polymer product of the polycondensation in the molten state or through use of conventional polymer and additive blending means, in which the polymeric components are heated to a temperature equal to or greater than the melting point of at least one of the polymers, and below the degradation temperature of each of the polymers. In a particularly preferred embodiment of this invention, the polymers are heated above the melting point of each of the polymers in the mixture. An effective amount of one or more chain extension reagent compounds in a liquid or powdered form is added to the melted polymers while at the same time vigorously stirring the melt, or added prior to melting and mixing. Heating is continued until the desired extended chain, or block and/or graft polyester or copolyester is formed as indicated by an increase in the melt viscosity.

In a more preferred embodiment, the components of the intimate mixture can be granulated, and the granulated components mixed dry in a suitable mixer, as for example, a tumbler or a Banbury Mixer, or the like, as uniformly as possible. Thereafter, the composition is heated in an extruder until the polymer components are melted. As described above, the mixture is heated until the desired extended chain, or block and/or graft copolymer or polymer is formed as indicated by an increase in the melt viscosity. Thereafter the mixture is ejected with cooling. In the most preferred embodiment, one or more effective chain extension reagents are injected directly into the molten stream of polymer formed from the polycondensation reaction wherein the polymer and chain extension reagent are thoroughly mixed prior to subsequent processing.

The order of mixing of the various components of the intimate mixture is not critical. Accordingly, the order of addition of the polymers and chain extension reagent compounds and other optional components to be described in more detail herein below, to form the intimate mixture, can be varied as desired.

The process can be carried out in a batchwise or discontinuous fashion, as for example, carrying out the process in a sealed container. Alternatively, the process can be carried out in a continuous fashion in a single processing zone, as for example, by use of an extruder as described hereinabove, or in a plurality of such reaction zones, in series or parallel.

Reaction temperature can be varied over a wide range. However, it should be appreciated that the process temperature employed in any specific instance will depend on the particular polyesters employed and on the choice of reaction medium. In the preferred embodiments for melt processing, the process temperature should be at least as high as the melting point of semicrystalline polymers or the glass transition temperature of amorphous polymers, and below the degradation temperature of such polymers. In the preferred embodiments of this invention, the process temperature is such that the polymers will remain in the molten state as the chain extended or block or graft copolymers or polymers are formed. Normally this can be accomplished in one of two ways. Either the process can be carried out at a temperature which is equal to or greater than the melting point of the desired product; or process temperatures can be increased periodically over the course of the conduct of the process so as to maintain the mixture in the molten state. An optimal process temperature is the highest temperature which is below the degradation temperature of the polymer(s). In the particularly preferred embodiments of this invention employing particularly preferred polyesters compositions, the process temperature is at least about 150° C. Amongst these particularly preferred embodiments, most preferred process temperatures are in the range of from about 200° C. to about 300° C. The processing temperatures for polyamides are similar to the above temperatures for polyesters.

Similarly, process pressures are not critical and can be varied widely without adversely affecting the process. Consequently, the process can be conducted at sub-atmospheric, atmospheric or super-atmospheric pressures. However, for convenience the process is carried out at atmospheric or autogenous pressure.

The process is carried out for a time sufficient to form the desired polymeric material as is indicated by an increase in the molecular weight, increase in the viscosity of the mixture and/or an decrease in the melt index. Reaction times can be varied over a wide range. Usually, reaction times will depend on a variety of factors such as the polymeric components, reaction temperatures, chain extension reagent compound and its concentration, and other factors known to those of skill in the art to affect reaction times. In most instances, the reaction time can vary from a few seconds to 24 hours or more. In the preferred embodiments of this invention, reaction times will vary from about 1 min. to about 2 hours and in the particularly preferred embodiments from about 2 min. to about 30 to 60 min.

Best results are obtained when the process of this invention is carried out in the presence of as little water as possible. Ideally, the conditions will be anhydrous, and this represents the most preferred embodiment of the invention. However, good results can be obtained when as much as 0.165 weight percent water based on the total weight of the mixture is present therein. In the preferred embodiments, the weight percent of water is less than about 0.1 weight percent, and in the particularly preferred embodiments, the weight percent of water is less than about 0.05 weight percent on the same basis.

One important feature of the polymers employed is that they must have reactive groups which allow coupling between the polymer reactants via the formation of a linking group. If only a single type of polymer is employed, the polymer must have at least two reactive groups which allow coupling via the formation of a linking group. The reactive groups of polymers are any functional group which react under the process condition to form a linking group through which the polymers are coupled. Illustrative of reactive groups are those which will form an amide or ester linking group under the process conditions. Reactive groups include amino, hydroxyl, carboxyl groups as well as derivatives thereof, such as salts.

To maximize the efficiency of increasing the viscosity of the polymer by the process of this invention, the nature and molar ratio of reactive groups on the polymer chains are selected in view of the nature of the reactive groups on the polymer reacted therewith. If one polymer has pendant amines, then the number of pendant carboxyl groups on the other polymer is maximized accordingly. If one polymer has pendant carboxylic acid groups, then the number of pendant hydroxyl groups or amine groups on the other polymer is maximized accordingly.

Illustrative of polymers which may be utilized in the process of this invention are synthetic linear polyamides characterized by the presence of recurring amide groups as an integral part of the polymer chain which are separated from one another by at least two carbon atoms. Polyamides of this type include polymers, generally known in the art as nylons, obtained from the condensation of an aminocarboxylic acid or an internal lactam thereof having at least two carbon atoms between the amino and the carboxylic acid groups. These polymers have the following general recurring unit:

—NHCO—R—NHCO—R— in which R is as described below. Polyamides to be used also include nylons obtained from diamines and dibasic acids having the recurring unit represented by the general formula:

—NHCORCONHR$^1$— in with R is an alkylene group of at least two carbon atoms, preferably from 2 to 12; and R$^1$ is selected from R and phenyl groups. Also, included are copolyamides and terpolyamides obtained by known methods, as for example, by condensation of hexamethylene diamine and a mixture of dibasic acids consisting of terephthalic acid and adipic acid.

Polyamides of the above description are well-known in the art and include, for example, the copolyamide of 30% hexamethylene isophthalamide and 70% hexamethylene adipamide, the copolyamide of up to 30% bis-(p-amidocyclohexyl) methylene, terephthalic acid and caprolactam, polyhexamethylene adipamide (nylon 66), poly(butyrolactam) (nylon 4), poly(enantholactam) (nylon 7), poly(capryllactam) (nylon 8), polycaprolactam (nylon 6), polyhexamethylene sebacamide (nylon 610), polyaminoundecanamide (nylon 11), polydodecanolactam (nylon 12) polyhexamethylene isophthalamide, polyhexamethylene terephthalamide, polycaproamide, or combinations thereof. The polyamide for use in the most preferred embodiments of this invention is polycaprolactam which is commercially available from Allied Corporation under the tradename of Capron TM Nylon.

Long chain hydrocarbon acids including 1, 2 or 3 carboxylic acid functions and up to about twenty-five carbon atoms and more can be grafted onto polymers having one or more amino functions in the process of this invention. Illustrative of such useful hydrocarbon acids are those having from about 0 to about 25 carbon atoms, which include such aliphatic mono-carboxylic acids as, for example, captic acid, lauric acid, myristic acid, pahitic acid, stearic acid, oleic acid, linoleic acid, behenic acid, pelargonic acid, and the like; aliphatic dicarboxylic acids such as sebacic acid, azelaic acid, and the like; aliphatic tricarboxylic acids such as critic acid, and the like; and the trimerized and dimerized derivatives of the above-mentioned fatty acids.

Other useful polymers include organic acid hpmopolymers and copolymers having pendant carboxylic functions. Illustrative of useful homopolymers and copolymers are those which are derived from the addition polymerization of $\alpha,\beta$-unsaturated carboxylic acids having 1 or 2 carboxyl groups and the addition copolymerization of such acids and other $\alpha,\beta$-unsaturated chemical species, as for example, olefins having the general formula $RCH=CH_2$, wherein R is phenyl, halogen, cyano, hydrogen, alkyl having from 1 to about 6 carbon atoms, alkoxycarbonyl having from 1 to about 6 carbon atoms, amido, and the like. Illustrative of such useful polymers are acrylamide/acrylic acid copolymer, poly(acrylic acid) polymer, poly(methacrylic acid) polymer, styrene/maleic acid copolymers; methacrylic acid/ethylene copolymer; acrylic acid/ethylene copolymer; acrylic acid/tetrafluoro ethylene copolymer; and homopolymers and copolymers of crotonic acid, isocrotonic acid, sorbic acid, cinnamic acid, fumaric acid and the like. Preferred organic acid polymers for use in this invention are copolymers of ethylene and acrylic acid, and copolymers of ethylene and methacrylic acid. Amongst the preferred copolymers particularly preferred are those in which the olefin content is at least about 75 mol percent based on the total moles of monomeric recurring units in the polymer. In preferred embodiments, polyesters are coupled with polymers containing recurring units of amino substituted aromatic moiety, for example poly(4-vinyl aniline), which is poly (p-amino styrene). The above homopolymers and copolymers are preferably used with one or more polyamides or polyesters. When reacted with one or more polyamides or polyesters, the homopolymer and/or copolymer should be solution processible or melt processible with the polyester or polyamides under process conditions.

Other polymers which may be employed in the process of this invention are linear or branched polyesters. The type of polyester is not critical and the particular polyester chosen for use in any particular situation will depend essentially on the physical properties and features, i.e. flexibility, hardness, toughness, desired in the final shaped article of manufacture. Thus, a multiplicity of linear thermoplastic polyesters having wide variations in physical properties are suitable for use in the process of this invention. One important feature polymers employed is that if only polyesters are reactants, the polyesters employed must have reactive groups which allow coupling between the polyester reactants via the formation of a linking group. The reactive groups of the polyesters are any groups which react under the process condition to form a linking group through which the polyesters are coupled. Illustrative of reactive groups are those which will form an amide or ester linking group under the process conditions. In such instances, preferably, a modified polyester donates the nitrogen or amine- containing group to the formation of the amide. Reactive groups include amino, hydroxyl, carboxyl groups as well as derivatives thereof, such as salts as discussed above.

The polyester may have a plurality of reactive groups distributed along the polymer backbone or at its terminal ends. Preferably, each polyester has at least one terminal reactive group. In alternative embodiments, the polyesters comprise two terminal reactive groups wherein such polyesters may contain the same terminal reactive group or two different terminal reactive groups. When one polyester contains two identical terminal groups, it is grafted (or coupled) with a another polymer having reactive groups which allow coupling with the two terminal groups of the polyester.

Often the polyesters are coupled via the formation of an ester as the linking group. For example, useful polyesters are those that are terminated with a hydroxy and/or carboxy group with the proviso that at least one of each of the two terminal reactive groups is present in the polymers selected for reaction therewith although an individual polymer need not possess both types of terminal groups. Preferably, the total mole ratio of terminal hydroxy groups to carboxy groups present in all polyesters employed ranges from about 10:1 to about 1:10. More preferably, the total mole ratio of terminal hydroxy groups to carboxy groups present in all polyesters employed ranges from about 4:1 to about 1:4. In further preferred embodiments, the total mole ratio of terminal hydroxy groups to carboxy groups present in all polyesters employed ranges from about 6:5 to about 5:6.

The particular polyester chosen for use can be homopolyester, or a random or block copolyester or terpolymer, or mixtures thereof as desired. Many polyesters are generally prepared by the condensation of an organic dicarboxylic acid and an organic diol, and, therefore, illustrative examples of useful polyesters will be described hereinbelow in terms of these diol and dicarboxylic acid precursors.

Polyesters which are suitable for use in this invention are those which are derived from the condensation of aromatic, cycloaliphatic, and aliphatic diols with aliphatic, aromatic and cycloaliphatic dicarboxylic acids. Illustrative of useful aromatic diols, are those having from about 6 to about 24 carbon atoms. Such aromatic diols include bis-(p-hydroxyphenyl)ether; bis-(p-hydroxyphenyl)thioether; bis-(p-hydroxyphenyl)-sulphone; bis-(p-hydroxyphenyl)-methane; 1,2-(bis-(p-hydroxyphenyl)-ethane); 1-phenyl-bis-(p-hydroxyphenyl)-methane; diphenyl-(bis-(p-hydroxyphenyl)-methane); 2,2-bis(4-hydroxydimethylphenyl) propane); 1,1-or 2,2-(bis(p-hydroxyphenyl) -butane ); 1,1-dichloro-or 1,1,1-trichloro-2,2-(bis-(p-hydroxyphenyl)-ethane); 1,1-(bis-(p-hydroxyphenyl)-cyclopentane); 2,2-(bis- (p-hydroxyphenyl)-propane (Bisphenol A); 1,1-(bis-(p-hydroxyphenyl)-cyclohexane) (hisphenol C); p-xylene glycol; 2,5-dichloro-p-xylylene glycol; p-xylene-diol; the fluoroalkyl and fluoroalkylene analogues of the above and the like.

Suitable cycloaliphatic diols include those having from about 5 to about 24 carbon atoms. Exemplary of such useful cycloaliphatic diols are 1,4-dihydroxy cyclohexane, 1,4-dihydroxy methylcyclohexane, 1,3-dihydroxy-cyclopentane, 1,5-dihydroxycycloheptane, 1,5-dihydroxycyclooctane, 1,4-cyclo-hexane dimethanol, 2,2-bis(4-hydroxycyclohexane)propane and the like.

Useful and aliphatic diols include those having from about 2 to about 12 carbon atoms, with those having from about 2 to about 6 carbon atoms being particularly preferred. Illustrative of such preferred diol precursors are 1,2-ethylene glycol, 1,3-propylene glycol, 1,2-propylene glycol, 1,8-octanediol, 1,6-nonanediol, neopentyl glycol, pentyl glycol, 1,6-hexanediol, 1,4-butanediol, and the like.

Cycloaliphatic diols and aliphatic diols are preferred for use. Propylene glycol, ethylene glycol, neopentyl diol, 1,4-dihydroxy methylcyclohexane, 1,4-butanediol and 2,2-bis(4-hydroxy cyclohexyl) propane are particularly preferred as diol precursors of polyesters for use in the conduct of this invention.

Suitable dicarboxylic acids for use as precursors in the preparation of useful polyesters are linear and branched chain saturated aliphatic dicarboxylic acids, aromatic dicarboxylic acids and cylcoaliphatic dicarboxylic acids. Polyesters containing up to about 80% repeat units of monomer containing both hydroxyl and carboxyl groups, such as hydroxybenxoic acid, vanillic acid, syringic acid and the like, may also be used in the practice of this invention. Illustrative of aliphatic dicarboxylic acids which can be used in this invention are those having from about 2 to about 50 carbons atoms, as for example, malonic acid, dimethylmalonic acid, succinic acid, itanoic acid, octadecylsuccinic acid, pimelic acid, adipic acid, trimethyladipic acid, sebacic acid, suberic acid, azelaic acid and dimer acids (dimerisation products of unsaturated aliphatic carboxylic acids such as oleic acid) and alkylated malonic and succinic acids, such as octadecylsuccinic acid, and the like.

Illustrative of suitable cycloaliphatic dicarboxylic acids are those having from about 6 to about 15 carbon atoms. Such useful cycloaliphatic dicarboxylic acids include 1,3-cyclobutanedicarboxylic acid, 1,2-cyclopentanedicarboxylic acid, 1,3- and 1,4-cyclohexanedicarboxylic acid, 1,3- and 1,4-dicarboxymethylcyclohexane and 4,4-dicyclohexyldicarboxylic acid, and the like.

Polyester compounds prepared from the condensation of a diol and an aromatic dicarboxylic acid are preferred for use in this invention. Illustrative of such useful aromatic carboxylic acids are terephthalic acid and isophthalic acid, 2,6- or 2,7-naphthalenedicarboxylic acid, 4,4'-diphenyldicarboxylic acid, 4,4-diphenylsulphone-dicarboxylic acid, 1,1,3-trimethyl-5-carboxy-3-(p-carboxyphenyl)-indane, diphenyl ether 4,4-dicarboxylic acid bis-p(carboxyphenyl) methane and the like. Of the aforementioned aromatic dicarboxylic acids based on a benzene ring such as terephthalic acid and isophthalic acid are preferred for use and amongst these preferred acid precursors terephthalic acid is particularly preferred. Copolymers and terpolymers prepared from mixtures of the above aromatic diacids are especially preferred.

In the most preferred embodiments of this invention, poly(ethylene terephthalate), poly(butylene terephthalate), poly(ethylene naphthalate) as well as copolymers and terpolymers thereof such as poly(ethylene/terephthalate/2,6-naphthalene dicarboxylate) and poly(tetramethylene/terephthalate/2,6-naphthalene dicarboxylate), are the polyesters of choice. Among these polyesters of choice, poly(ethylene terephthalate) and the copolymers and terpolymers thereof are most preferred.

The process of this invention employs one or more chain extension reagents. The reagents are referred to as chain extension reagents since they will extend polymeric chains by coupling the polymeric chains together at reactive sites on the polymer reactants. The reaction of chain extension is the coupling reaction that occurs via the formation of a linking group between reactant polymers. An effective chain extension reagent is a compound containing a trivalent phosphorus atom (phosphorus III) to which is attached at least one effective leaving group, but not more than three leaving groups. The effective leaving group is a nitrogen-containing heteroaromatic group bonded to the phosphorus atom, and the heteroaromatic group is bonded to the phosphorus atom through a nitrogen atom which is single bonded to the phosphorus atom. A general formula for a chain extension agent is a compound of the formula:

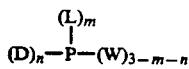

wherein D is a leaving group which is a nitrogen-containing heteroaromatic moiety that is bonded through a nitrogen of the heteroaromatic moiety to the phosphorus (III) atom by a single bond; L is a leaving group other than D and is a group containing a hetero atom bonded to the phosphorus atom, and the hetero atom is bonded to a carbon which is double bonded to an atom other than the hetero atom such that the hetero atom either forms a conjugated system with the double bonded carbon or the hetero atom is bonded to a carbon of a conjugated system with L being a cyclic aromatic or cyclic non-aromatic group; wherein W is a moiety other than D or L which does not inhibit or substantially hinder the ability of the chain extension reagent in the process and wherein n is an integer from 1 to 3 and m is an integer from 0 to 2. It is noted that one, two or three of the valences of the phosphorus atom can be filled by above nitrogen-containing leaving groups.

A summary diagram of the chain extension reaction is shown below in equations A₁ for the formation of an amide linkage and in equations B₁ for an ester linkage.

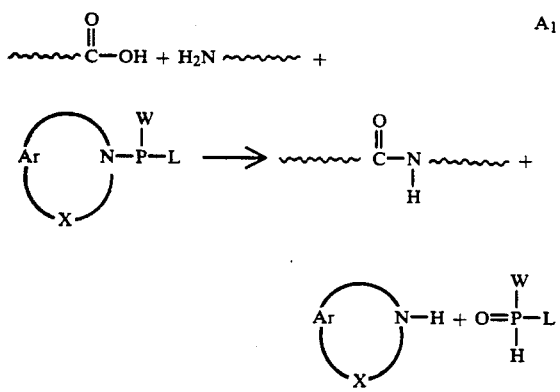

wherein X is a carbon or nitrogen atom and Ar represents the remaining linkage which forms with N a heteroaromatic ring.

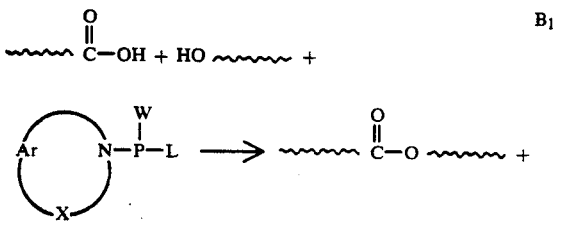

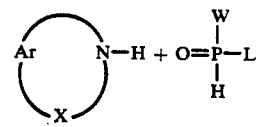

It is believed that the conjugated system of the leaving group provides the leaving group with the ability to delocalize negative charge and therein the leaving group is a "stable" moiety. The phenomenon of stability as used herein relates to the ability of the leaving group to delocalize negative charge within its structure. Illustrative of heteroaromatic leaving groups are pyrrolyl, indolyl, carbazolyl, imidazolyl and benzimidazolyl.

The nitrogen-containing heteroaromatic leaving groups as described above may be substituted or unsubstituted. They may be substituted with one or more of the following: cyano, nitro or halo groups alkyl, alkoxy, aryl or aryloxy groups.

As shown above, the other valences of the phosphorus often can be filled with (1) other types of leaving groups or (2) moieties other than leaving groups which do not inhibit or substantially hinder the ability of the chain extension reagent in the process. Exemplary of moieties other than leaving groups are substituents such as halogen, hydroxyl, alkyl, alkoxy, or aryl.

Other effective leaving groups contain a hetero atom bonded to the phosphorus atom, and the hetero atom is bonded to a carbon which is double bonded to an atom other than the hetero atom. Preferably, the hetero atom is sulfur, nitrogen or oxygen. More preferably, the hetero atom is nitrogen or oxygen. The hetero atom either forms a conjugated system with the double bonded carbon or the hetero atom is bonded to a carbon of a conjugated system.

An effective leaving group can be a cyclic aromatic or cyclic non-aromatic. It is noted that cyclic includes monocyclic and polycyclic moieties. Preferably, the leaving group is a cyclic structure; that is the hetero atom of the leaving group is part of a cyclic ring or the carbon to which the hetero atom is bonded is part of a cyclic ring. It is proposed that the cyclic structures can more efficiently delocalize negative charge than a linear leaving group. When the hetero atom is part of the cyclic ring it is preferred that the hetero atom is nitrogen. Chain extension reagents having such nitrogen bonded to the phosphorus atom are referred to herein as phosphinamines.

Illustration of other leaving groups are lactams, which are shown below attached to a phosphorus (III) atom.

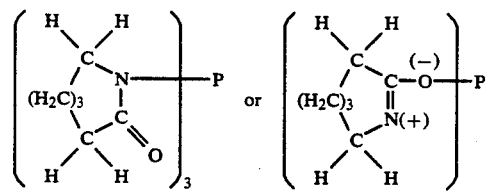

Additional lactam-containing chain extension reagents are disclosed by R. Mateva and N. Dencheva, *J. Polym. Sci: Part A: Polym. Chem.* 30, 1449 (1992).

In alternatively preferred embodiments of the invention, the phosphorus atom is bonded to the nitrogen of an imide. A leaving group can be an imide such as succinimide, phthalimide and maleimide as shown below.

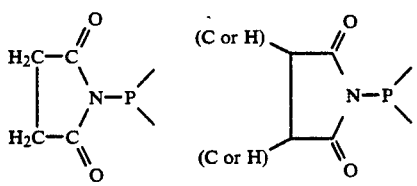

In further preferred embodiments of this invention, the chain extension reagent has (a) two or more aryl containing leaving groups wherein the hetero atom of the chain extension reagent is bound to a carbon atom of the aryl group and (b) one or more leaving groups is an effective nitrogen-containing heteroaromatic leaving group.

Of particular interest are the aryl containing leaving groups wherein said leaving group is connected to the phosphorus (III) atom via an oxygen. Illustrative of effective leaving groups. The aryloxy moiety of the phosphite can be derived from any aromatic alcohol which contains a hydroxylated aryl group; wherein the aryl group is substituted or unsubstituted yet the aryl ring itself is hydroxylated. Useful aromatic compounds employed in forming the aryloxy groups are mono-, di- and other polycyclic aromatics, which include but are not limited to substituted and unsubstituted benzenes, naphthalenes, anthracenes, biphenyl or polyphenyl compounds, methylene bridged aromatic compounds and the like. Preferably, the aromatic group which forms the aryloxy is selected such that the aryloxy group is a least hazardous, volatile or toxic material.

The above chain extension reagents of this invention can be employed with other such reagents. Many of the useful chain extensions are phosphite esters. Illustrative of useful phosphite esters and polyphosphite esters are compounds of the formula I:

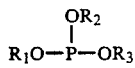

and asymmetrical and symmetrical phosphite derivatives thereof having more than one phosphite ester moiety wherein:

$R_1$, $R_2$ and $R_3$ are the same or different and are hydrogen, metal cations, ammonium radicals, or substituted or unsubstituted aryl or alkyl wherein permissible substituents are one or more alkyl, alkoxy, cyano, nitro or halo groups, or $R_1$, $R_2$ and $R_3$ individually may form a moiety of the formula II:

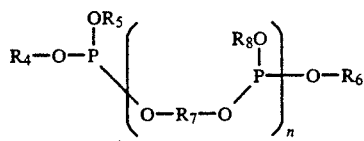

wherein n is 0 or a positive whole number and $R_4$, $R_5$ and $R_6$ are the same or different and are $R_1$, $R_2$ and $R_3$, $R_7$ can be a single bond between the two oxygens, or a divalent aromatic or aliphatic group, $R_8$ can be $R_4$, $R_5$, or $R_6$; and $R_5$, $R_7$ and $R_8$ together can be polyalkoxy group derived from an aromatic or aliphatic polyalcohol; with the proviso that each phosphite moiety includes a substituted or unsubstituted aryl group.

Permissible $R_1$, $R_2$ and $R_3$ groups include aliphatic groups such as t-butyl, n-butyl, isopropyl, hexyl, pentyl, 2-chloroethyl, neophentyl, decyl, dodecyl, isodecyl, butoxyethyl, 3-chlorobutyl and the like; aromatic groups such as 2,4-di-tert-butyl-phenyl, 4-tert-butylphenyl, 3-isopropylphenyl, 2,4-dimethylphenyl, 4-nonylphenyl, octylphenyl, 4-chlorophenyl, 2,4-dibromophenyl, 4-fluorophenyl, 3,5-dichlorophenyl, 4-cyanophenyl, 2-nitrophenyl, bisphenol methyl and the like; metal cations such as sodium, potassium, zinc, lithium, calcium, aluminum, and the like and groups containing one or more phosphite moieties, as for example, ethylene diphenyl phosphite, or a poly-(dipropylene glycol) phenyl phosphite moiety bonded to the oxygen atom via the dipropylene glycol moiety.

Preferred for use in the practice of this invention are phosphite esters of the above formula in which:

$R_1$, $R_2$ and $R_3$ are the same or different and are a alkyl, aryl or aryl substituted with one or more alkyl groups, with the proviso that at least one of $R_1$, $R_2$, and $R_3$ is aryl or substituted aryl. More preferred for use are such esters in which at least two of $R_1$, $R_2$, $R_3$ are aryl or alkyl substituted aryl, and most preferred for use are those esters in which $R_1$, $R_2$, and $R_3$ are the same or different and are aryl or alkyl substituted aryl, such as nonyl phenyl or 2,4-di-tert butyl phenyl. For many of the preferred embodiments, $R_1$, $R_2$, and $R_3$ are selected from phenyl groups, bisphenyls and "novolac-type" polyphenyls known in the art and described herein infra.

Preferably, $R_7$ is an alkoxy or polyalkoxy derived from a divalent aromatic alcohol such as hisphenol A or a biphenol. When $R_5$, $R_7$ and $R_8$ together are a polyalkoxy of a polyalcohol, the polyalcohols may be a pentaerythritol, pyrogallol, tetrahydroxy benzophenone, and saccharides, such as galactose, or polyalcohols such as phenol-aldehyde or resorcinol-formaldehyde oligomers and the like.

Additional phosphite esters which can be employed in the practice of the invention are disclosed in the following publications: U.S. Pat. Nos. 3,367,996 to Strauss; 3,697,459 to Dannels et al.; 3,949,024 to Beck et al. and 5,068,388 to Gatto.

Examples of phosphites having biphenyls and polyphenyls in the aryloxy group are disclosed by Beck et al. and are shown the formula below.

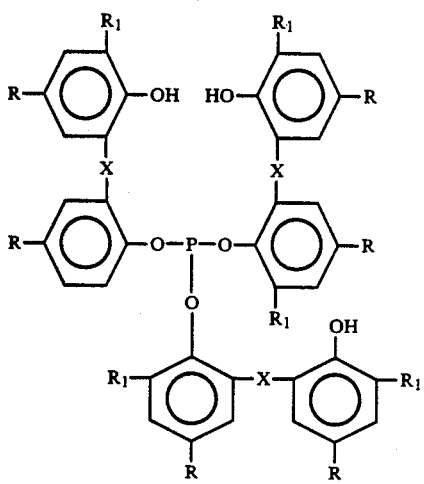

wherein X is sulfur or lower alkylene (e.g. methylene); R is hydrogen or an alkyl radical and $R_1$ is an alkyl radical.

For novolac phosphites, one or more, preferably three of the oxygens of the phosphite ester are bonded to the same compound, which may be a dimer, oligomer or polymer of a repeating unit as shown below:

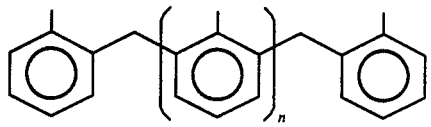

wherein n=0 to about 6.

Some of the "novolac-type" phosphites which are disclosed by Gatto are shown below.

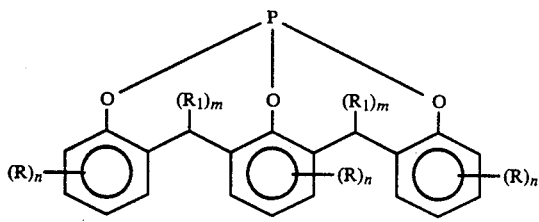

wherein each R and $R_1$ is an independently selected $C_1$-$C_6$ alkyl radical, n=1, 2 or 3 and m=0 or 1.

An effective amount of one or more effective chains extension reagents is employed in forming the intimate mixture. As used herein, "an effective amount" is an amount of the chain extension reagents which when added to the polymeric component in accordance with this invention forms a mixture which when heated forms the desired extended chain polymer, or block and/or graft copolymer. The formation of the extended chain polymer or block or graft polymer or copolymer will be accompanied by an increase in the melt viscosity of the mixture. As sued herein, "viscosity" denotes the internal friction, i.e. resistance to flow of the polymer mixture, and is well known in the art. A wide variety of viscometers are available for measurement of viscosity, such as capillary, rotational, orifice, falling ball, and oscillatory types. They are described in Barr, "A Monograph of Viscometry" Oxford, N.Y. (1931) and Kirk and Othmer, "Encyclopedia of Chemical Technology" Vol 14 pp 756–775 the Interscience Encyclopedia, Inc., New York (1955).

In the preferred embodiments of this invention, the quantity of the one or more chain extension reagents employed is at least about 0.05 weight percent, based on the total weight of the mixture. In the particularly preferred embodiments of this invention, the weight percent of reagent compounds is in the range of from 0.1 to about 10 weight percent, and amongst these particularly preferred embodiments, those in which the quantity of reagent compounds employed is from about 0.4 to about 4 weight percent based on the total weight of the mixture are most preferred.

The polymeric materials prepared in the process of this invention can be employed directly in many applications without modification. However, various other optional ingredients, which are normally included in polymer compositions, may be added to the mixture at an appropriate time during the conduct of the process. For example, these optional ingredients can be added either prior to or after melting of the polymers in the first step of the process of this invention; or after the conduct of the second step in which the desired graft copolyester have been formed. The optional ingredients can also be added thereafter while forming the compositions, e.g. blends or composites. Such optional components include fillers, plasticizers, crystallization nucleating agents, impact modifiers, colorants, mold release agents, antioxidants, ultraviolet light stabilizers, lubricants, antistatic agents, fire retardants, and the like. These optional components are well known to those of skill in the art, accordingly, only the preferred optional components will be described herein in detail.

The polymer products or compositions and composites comprising such products may also include a particulate filler, which functions to increase the modulus and stiffness of the composition, and provides a more economical composition. Any conventional filler can be employed provided that it provides all or a portion of the above-identified functions, and does not otherwise have a deleterious effect on the composition. The fillers may optionally be treated with various coupling agents or adhesion promoters as is known to those skilled in the art. Useful fillers may be selected from a wide variety of minerals, metals, metal oxides, siliceous materials, metal salts, and mixtures thereof. Examples of such useful fillers include glass fibers, carbon fibers, alumina, aluminum hydrates, feldspar, talc, calcium carbonates, clay, carbon black, glass quartz, novaculite and other forms of silica, kaolinite, bentonite, garnet, mica, saponite, heidellite, calcium oxide, calcium hydroxide, and the like such fillers are well known materials and are readily available. The foregoing recited fillers are illustrative only and are not meant to limit the scope of the fillers that can be employed in this invention. In the preferred embodiments of this invention fibrous materials are the fillers of choice, and glass fiber is the filler of choice in the particularly preferred embodiments of this invention.

The quantity of filler employed is not critical and can be varied widely as desired. In the preferred embodiments of this invention, the quantity of filler is up to about 150 weight percent based on the total weight of the polymer and phosphite components, and in the particularly preferred embodiment is in the range of from about 30 to about 110 weight percent on the same basis.

It is also very desirable to include plasticizers of the types known in the art for use with polymer composition. Useful plasticizers may vary widely and will depend on the type of polymers employed and other factors known to those of skill in the art.

The process of this invention provides graft copolyesters having decreased melt indexes and increased viscosities. Such polymers are useful as tire cord in pneumatic tires, and in the manufacture of films and molded parts. Such uses for polyester materials are well known in the art and will not be described herein in great detail.

The following specific examples are presented to more particularly illustrate the invention, and should not be construed as being limitations on the scope and spirit of the invention.

EXAMPLES

A chain extension agent for use in the following experiments is tri-(imidazolyl) phosphine, which is shown below:

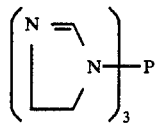

Tri-(imidazolyl) phosphine can be prepared by the dropwise addition of a solution of phosphorus trichloride in tetrahydrofuran (THF) to a solution of imidazole in THF under a nitrogen atmosphere. The reaction vessel is kept at a temperature of about 0° C. by being placed in a bath of crushed ice/water mixture, to prevent heating due to the exothermic nature of the reaction. In order to remove the hydrochloride by-product, the molar ratio of imidazole to phosphorus trichloride is kept at slightly over 6:1. A convenient concentration of the reagents in the THF is 5 to 10 weight/volume percent. After the dropwise addition is completed, the reaction mixture is stirred for an additional 30 minutes and the by-product imidazolium hydrochloride filtered off. The clear filtrate is vacuum-dried under a nitrogen bleed at temperature not higher than 50° C. and the solid tri(imidazolyl)phosphine chain extending reagent is stored under nitrogen until further use. It appears as a fine-grain crystalline solid and is added to the appropriate chain-extension reaction mixture as such.

EXAMPLE 1

Chain extension or block copolymer or graft copolymer creation in solution

A typical solution chain extension reaction is: In a 2000 ml round bottom flask there is dissolved 50 g nylon-6 (M.W. =33,2000 by light scattering) in 1000 ml N,N-dimethylacetamide (DMAc) containing 5% by weight LiCl. The dissolution temperature is 135° C. After the polymer is dissolved, 2 weight percent of the above chain extension agent, and an equimolar amount of pyridine is added. To keep the pyridine in solution, a Vigoreaux reflux column is attached and the pyridine is refluxed throughout. After conducting the reaction for up to 6 hours at 130° C., the reaction is terminated by pouring it into methanol. The product is washed and dried.

Block copolymers of nylon-6 with nylon-66, or nylon-6 with nylon-11 or nylon-6 with nylon-12 can be prepared in the same way, using the ratios of 1:1, 85:15 and 95:5 of nylon-6 to the other polyamide*. The formation of block copolymers is shown by the inability of the majority of the reaction product to dissolve in solvents selective for either polyamide. In the case of nylon-6/nylon-66 block copolymers, measurements of melting point changes relative to the pure precursor polymers, establish the formation of copolymers.

*The ratio of polymer reactants can vary substantially, i.e. from 0.01 to up to 100, provided that the graft or block copolymer does not crosslink and gel during the reaction.

EXAMPLE 2

Additional examples of chain extension, block and graft copolymer reactions which can be conducted under similar solution process conditions to those of Example 1 are shown by the following Table I. For the reactions of Table I, N-methyl-2-pyrrolidinone (NMP) can be used as a solvent. For the Nylon reactions, 5 wt% of LiCl is employed and no salt is used for the remaining reactions.

TABLE I

| Polymer | Nylon-6 | | | |
|---|---|---|---|---|
| Nylon-6 | Yes | Nylon-66 | | |
| Nylon-66 | Yes | Yes | PET | |
| PET | Yes | Yes | Yes | Poly(acrylic acid) |
| Poly(acrylic acid) | Yes | Yes | Yes | — |
| Poly(vinylbenzyl)amine | Yes | Yes | Yes | Yes |

PET = poly(ethylene terephthalalte)

EXAMPLE 3

Chain Extension of Nylon-6 by tri(imidazolyl)phosphine in the melt

Nylon-6 (Allied-Signal Inc., Capron grade 8207F with number average molecular weight of 19,000) is dried in a vacuum oven under dynamic vacuum for 16 hours at temperature of 110° C. After cooling in a sealed glass jar, 2 weight % of tri(imidazolyl) phosphine is added to the polymer and the jar is rapidly sealed again. The mixture is thoroughly mixed by with the chain extending agent. Then the mixture is fed through a Wayne 1' extruder equipped with a single L/d =24 screw and a Koch static mixer operating at a nominal temperature of 285° C. The residence time in the extruder is controlled by pre-setting the rpm of the screw, and is usually set at not less than 60 seconds and not more than 15 minutes with a sufficient residence being from about 2 minutes to about 7 minutes at temperature. The nominal temperature in the Wayne extruder is defined as the set-temperature of the third heating zone, out of the four heating zones this machine has. In the machine the polymer and chain extension agent are melted and thoroughly mixed and allowed to react to increase the average length of the polymeric chains. The reacted polymer is then extruded out of the extruder, the polymeric strand is passed through a cold water bath, then chopped to pellets and is dried in a forced-air draft oven or a vacuum oven, operating at about 110° C.

To determine the efficiency of the chain extension, samples of the chain-extended polymer and of a nylon-6 blank (i.e. a polymer is exposed to the same processing conditions, but in the absence of the chain extension reagent) are dissolved in m-cresol to concentrations of 0.5% and less, and the viscosity measured in internal dilution Cannon-Ubbelohde glass viscometers as is known in the art. A viscosity value of the reacted polymer higher than that for the blank, is taken to indicate that chain extension took place.

EXAMPLE 4

Chain Extension of PET by Reaction With Tri(imidazolyl) Phosphine in the Molten State Poly(ethylene terephthalate) (PET) of number average molecular weight of about 30,000 is thoroughly dried in a vacuum over under dynamic vacuum condition at about 130° C. for about 16 hours; the polymer being present is cooled in the oven, 2 weight % tri(imidazolyl)phosphine are added to the PET, the jars carefully sealed and then tumbled for at least 15 minutes to effect a thorough mixing of the polymer and the chain extending agent. At the end of the mixing, the agent coats the polymeric pellets with a thin layer of fine particles. The mixture is then fed through a Wayne extruder as described in the previous example, with the Wayne extruder being set at a nominal temperature of 285° C. The processed polymer is then chopped and dried as before, and its viscosity is measured in a solvent mixture containing 60% phenol and 40% tetrachloroethane. The dissolution of the polymer is effected at elevated temperatures, such as 130° C., and the intrinsic viscosity is obtained from extrapolation to zero concentration of solution viscosity measurement at 25° C. performed on solutions of decreasing concentration starting with polymer concentration of 0.5%. For comparison, a blank polymer is exposed to the same processing conditions, but in the absence of the chain extension reagent. A viscosity value of the reacted polymer higher than for the blank polymer is taken as an indication that a chain extension reaction took place.

EXAMPLE 5

Additional examples of chain extension, block and graft copolymers, block and graft copolymer reactions which can be conducted under similar melt process conditions to those the above in Example 3 are shown in Table II below.

For these melt processing experiments, one can use either Haake Rheocord-90 melt processor or a Wayne 1' extruder, equipped with a 24' long screw and a fine-pore static mixer made by Koch. The specific equipment is not important provided it can keep the polymer or polymers in the melt and thoroughly mix them with one another and with the chain extension reagent, and where the temperature and residence time at that temperature can be varied and controlled as desired.

The amounts of the polymers in the block or graft copolymers may vary as indicated in Example 1. The amount of chain extender reagent may vary by weight of polymer but about 10% by weight is sufficient. A processing time of from 1 to 10 minutes is generally sufficient. A reaction temperature of about 275°–285° C. is normally sufficient. It is noted that the reaction temperature is limited from below by the temperature at which the polymer or polymers become melt-processible (either melting temperature, or glass transition temperature when the polymers are amorphous). Form above, the processing temperature is limited by the degradation temperature of the polymers involved.

TABLE II

| Melt Processing Chain Extension | | | | | |
|---|---|---|---|---|---|
| Polymer | Nylon-6 | | | | |
| Nylon-6 | Yes | Nylon-66 | | | |
| Nylon-66 | Yes | Yes | Nylon-11 | | |
| Nylon-11 | Yes | Yes | Yes | Nylon-12 | |
| Nylon-12 | Yes | Yes | Yes | Yes | PET |
| PET | Yes | Yes | Yes | Yes | Yes | PBT |
| PBT | Yes | Yes | Yes | Yes | Yes | Yes |
| Poly (ethylene co-acrylic acid) | Yes | Yes | Yes | Yes | Yes | Yes |
| Ionomer Surlyn 1855 (DuPont) | Yes | Yes | Yes | Yes | Yes | Yes |
| Poly (4-Amino Styrene) | Yes | Yes | Yes | Yes | Yes | Yes |
| Poly (Vinyl Benzyl-amine) | Yes | Yes | Yes | Yes | Yes | Yes |

Ionomer Surlyn 1855 is a DuPont product is a terpolymer containing ethylene, an ester of methacrylic acid and the methacrylic acid itself is partly neutralized by zinc cations. PBT and PET are as described in the specification.

EXAMPLE 6

Examples of Preparation of polyester-Based Graft Copolymers by Melt Processing

PET is thoroughly dried prior to use.

1) To 100 g dry PET (I. V.=0.7) there is added 2.0 g Poly(acrylic acid) (M. W.=250,000; Aldrich cat. no. 18,128-5) and 2.0 g of the chain extension agent. The mixture is sealed in a glass jar and thoroughly mixed by prolonged tumbling.

2) The above is identically repeated except that the flexible chain polymers along whose backbone the PET was grafted is, in this case a carboxy-modified polyacrylamide (Aldrich cat. no. 19,092-6).

In both samples above, the amount of flexible backbone polymer and chain extension agent for each is about 2 weight percent by weight of the PET.

The grafting can be effected by melt-kneading the mixture in Haake Rheocord-90 machine. The progress of the grafting is then followed by monitoring the changes in the torque of the Haake Rheocord-90 instrument. About 60 g of the mixture should be charged into the cavity of a Haake Rheocord-90 instrument and melt-mixed at about 285° C. for up to 20 minutes. Other melt-processing machines are useful for the same purpose as the Haake Rheocord-90.

What is claimed is:

1. A process for forming chain extended polymers which comprises the steps of:
   (a) forming an intimate mixture of one or more polymers and an effective amount of one or more effective phosphorus(III)-containing chain extension reagent compounds;
   wherein said polymer or polymers have one or more reactive groups for chain extension of said polymer or polymers;
   wherein said effective phosphorus (III)-containing chain extension reagent is not a trislactam;
   wherein at least one of said effective chain extension reagents has bonded to the phosphorus(III) atom at least one group which is a nitrogen-containing heteroaromatic moiety that is bonded through a nitrogen of the heteroaromatic moiety to the phosphorus(III) atom by a single bond; and (b) heating said mixture for a time and at a temperature sufficient to form said extended chain polymer or copolymer.

2. The process of claim 1 wherein said reactive groups are selected from the group consisting of hydroxyl, carboxyl and amino groups or derivatives thereof.

3. The process of claim 1 wherein said one or more polymers of step (a) are selected from the group consisting of polyamides, polyesters and polymers having one or more reactive groups, wherein the latter polymers are reactive with said polyamides or polyesters under the process conditions.

4. The process of claim 1 wherein at lest one of said phosphorus (III) chain extension reagents is a compound of the formula:

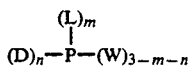

wherein D is a leaving group which is a nitrogen-containing heteroaromatic moiety that is bonded through a nitrogen of the heteroaromatic moiety to the phosphorus (III) atom by a single bond; L is a group containing a hetero atom bonded to the phosphorus atom, and the hetero atom is bonded to a carbon which is double bonded to an atom other than the hetero atom such that the hetero atom either forms a conjugated system with the double bonded carbon or the hetero atom is bonded to a carbon of a conjugated system with L being a cyclic aromatic or cyclic non-aromatic group; wherein W is a moiety other than D or L which does not inhibit or substantially hinder the ability of the chain extension reagent in the process and wherein n is an integer from 1 to 3 and m is an integer from 0 to 2.

5. The process of claim 1 wherein at least one of said phosphorus (III) chain extension reagents is a compound of the formula:

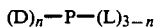

wherein D is a group which is a nitrogen-containing heteroaromatic moiety that is bonded through a nitrogen of the heteroaromatic moiety to the phosphorus (III) atom by a single bond; L is a group containing a hetero atom bonded to the phosphorus atom, and the hetero atom is bonded to a carbon which is double bonded to an atom other than the hetero atom such that the hetero atom either forms a conjugated system with the double bonded carbon or the hetero atom is bonded to a carbon of a conjugated system with L being a cyclic aromatic or cyclic non-aromatic group; and wherein n is an integer from 1 to 3.

6. The process of claim 1 wherein the intimate mixture is a molten mixture.

7. The process of claim 3 wherein the polyesters are selected from poly(ethylene terephthalate), poly(butylene terephthalate), poly(ethylene naphthalate), poly(ethylene/terephthalate/2,6-naphthalene dicarboxylate) and poly(tetramethylene/terephthalate/2,6-naphthalene dicarboxylate).

8. The process of claim 3 wherein the polyesters are selected from poly(ethylene terephthalate), poly(butylene terephthalate), poly(ethylene naphthalate).

9. The process of claim 3 wherein the polyester is poly(ethylene terephthalate).

10. The process of claim 3 wherein the polyester is poly(ethylene naphthalate).

11. A polymer or graft or block polymer or copolymer prepared in accordance with the process of claim 1.

12. A polyester or graft or block polyester or copolyester prepared in accordance with the process of claim 7.

13. An article formed totally or in part from one or more extended chain polymers of claim 1.

14. The process of claim 1 wherein said one or more polymers of step (a) are polyamides.

15. The process of claim 1 wherein the polyamides are selected from a copolyamide of hexamethylene isophthalamide, a copolyamide of bis-(p-amidocyclohexyl) methylene, terephthalic acid and caprolactam, polyhexamethylene adipamide, poly(butyrolactam), poly(enantholactam), poly(capryllactam), polycaprolactam (polycaproamide), polyhexamethylene sebaçamide, polyaminoundecanamide, polydodecanolactam, polyhexamethylene terephthalamide, or combinations thereof.

16. A process for forming chain extended polymers which comprises the steps of:

(a) forming an intimate mixture of one or more polymers and an effective amount of one or more effective phosphorus (III)-containing chain extension reagent compounds;

wherein said polymer or polymers have one or more reactive groups for chain extension of said polymer or polymers;

wherein said polymer is not selected from polyphenylene ethers;

wherein at least one of said effective chain extension reagents has bonded to the phosphorus(III) atom at least one group which is a nitrogen-containing heteroaromatic moiety that is bonded through a nitrogen of the heteroaromatic moiety to the phosphorus(III) atom by a single bond; and (b) heating said mixture for a time and at a temperature sufficient to form said extended chain polymer or copolymer.

17. The process of claim 1 wherein the polyesters are selected from poly(ethylene terephthalate), poly(butylene terephthalate), poly(ethylene naphthalate), poly(ethylene/terephthalate/2,6-naphthalene dicarboxylate) and poly(tetramethylene/terephthalate/2,6-naphthalene dicarboxylate).

18. The process of claim 16 wherein said reactive groups are selected from the group consisting of hydroxyl, carboxyl and amino groups or derivatives thereof.

19. The process of claim 16 wherein said polymers are selected from polyamides.

* * * * *